United States Patent Office 3,589,887
Patented June 29, 1971

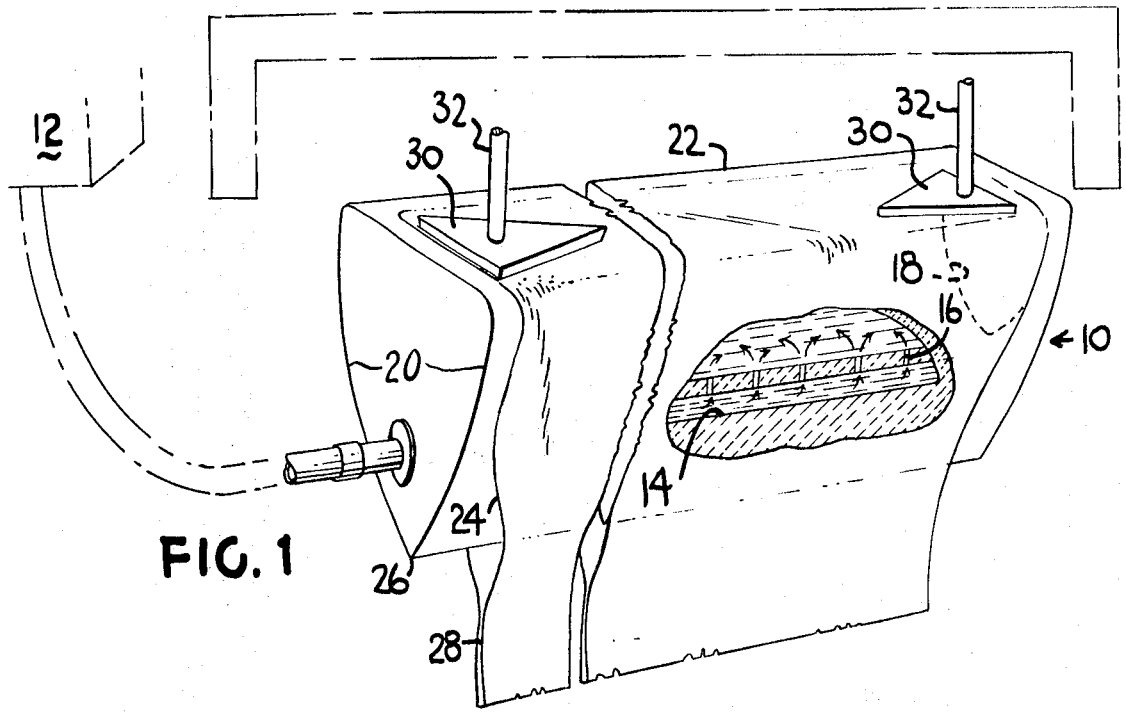
FIG. 1
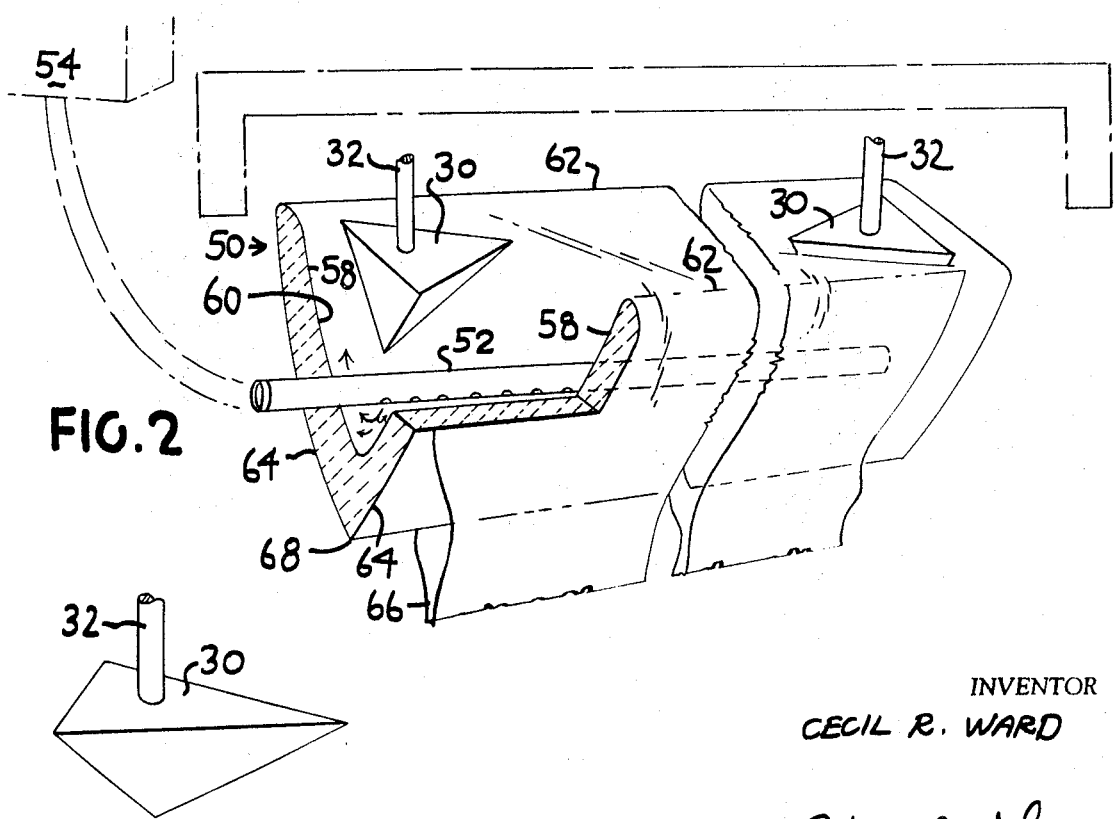
FIG. 2
FIG. 3
INVENTOR
CECIL R. WARD
BY
*Christolm and Spencer*
ATTORNEYS

3,589,887
EDGE RESTRICTOR IN DOWN DRAWN GLASS
Cecil R. Ward, Gibsonia, Pa., assignor to PPG Industries, Inc., Pittsburgh, Pa.
Filed June 3, 1968, Ser. No. 733,870
Int. Cl. C03b 17/00
U.S. Cl. 65—195          3 Claims

ABSTRACT OF THE DISCLOSURE

In order to produce a substantially uniform thickness sheet of glass by the downdraw process which utilizes a nozzle having edges over which the glass flows, adjustable pyramidal-shaped members are provided to adjust and restrict the quantity of glass which flows over the nozzle adjacent to its ends and to substantially eliminate the usual bulb edge.

BACKGROUND OF THE INVENTION

In one form of downdraw of sheet glass, molten glass is delivered into a cavity in a nozzle and glass overflows the upper longitudinal edges of the nozzle and forms streams which flow down the opposite sides thereof to join at the apex to produce a sheet of glass. Generally the streams of glass and the resultant sheet neck down, i.e., become less in width during their formation, such that a bulb edge is formed. Because the bulb edge is thicker than the desired thickness, it must be trimmed. Also, to maintain sheet width, edge grippers are at times employed. These mark the glass and that portion must be edge trimmed. As can be seen there is much waste in trimming the edges of the sheet and, of equal importance, the resultant cut edge is of less strength than a formed, fire-polished edge.

SUMMARY OF THE INVENTION

In accordance with this invention, the flow of glass from zones at the ends of the forming nozzle is restricted, such that a lesser quantity of glass flows therefrom than from the remainder of the nozzle. When the glass necks down in width, the quantity of glass in the edge portions is sufficient to be of a thickness substantially like that of the central portion of the glass. The resultant sheet is of substantially equal thickness across its width. Also the edges of the resultant ribbon, being of less thickness than previously produced, permit a more uniform cooling across the ribbon. This has a major effect in maintaining the width of the ribbon without the edge gripping means because the edges become frozen soon after leaving the nozzle. Thus, an additional advantage is that no edge gripping means are required to produce this uniform thickness ribbon.

To accomplish the results described above, a generally wedge-shaped member and preferably a substantially pyramidal-shaped insert, constructed of a material substantially inert with respect to molten glass, such as a clay refractory or platinum, is placed in the ends of the nozzle with the apex toward the center. Such a member is adjustably mounted and changes the quantity of glass flowing from the nozzle. In order to reduce devitrification of the glass, the member may be heated, if required.

The drawings:
FIG. 1 is an illustration of a typical downdraw nozzle with a flow controlling member positioned at each end thereof;
FIG. 2 is an illustration similar to FIG. 1 except that one end is sectional for purposes of illustration, illustrating a different nozzle construction but with a similar flow controlling member; and
FIG. 3 is an illustration of a typical flow controlling member.

THE SPECIFIC EMBODIMENT

Looking now at FIG. 1, there is shown a downdraw forming nozzle 10, which may be of a clay refractory or other suitable material which will not materially react with molten glass and to which molten glass is fed from a suitable source 12 to a conduit 14 in the nozzle, through a series of openings 16 and into a trough 18. The glass fills the trough 18 and overflows the longitudinal edges 20, so as to flow as opposite streams 22, 24 toward the apex 26 of the nozzle 10 forming a ribbon of glass 28.

The glass necks down, as shown. Edge controlling means 30 which are illustrated as being pyramidal in shape and suitably supported for adjustment by supports 32 are inserted in the trough 18 and into the glass therein, so as to restrict or control the quantity of glass which flows over the edges 20 at the ends of the nozzle 10, thinning the streams at the ends yet producing a substantially uniform-thickness ribbon 28 which can then be transported, in any conventional manner, away from the nozzle.

In FIG. 2, glass is delivered into the nozzle 50 through a feed pipe 52 connected to a suitable source of glass 54 and passes through openings 56 in the feed pipe 52 so as to be extruded between the feed pipe 52 and the interior walls 58 of the nozzle. The glass fills the cavity 60 defined by the walls 58 and flows over the longitudinal edges 62 to form opposite streams along the walls 64 to form a sheet or ribbon 66 at the apex of the nozzle 68. Edge controlling means 30 are positioned at the ends of the nozzle 50 to control the flow of glass in the same manner as previously described.

FIG. 3 shows the pyramidal edge controlling means 30 and its supporting means 32 removed from operating position.

In order to prevent devitrification adjacent the means 30, radiant heaters (not shown) may be positioned thereover. Generally, nozzles such as described are operated within a muffle, as indicated by the broken lines in FIGS. 1 and 2. While the edge controlling means 30 are illustrated as being pyramidal in shape, generally wedge-shaped members may be used and perform their function satisfactorily.

In actual practice a nozzle 16 inches in length with a cavity width of 3¼ inches measured from overflow edge to overflow edge was used to produce glass ⁵⁄₁₆ inch thick. A pyramidal-shaped member 3¼ inches at its base and 2 inches in length (altitude) was inserted in the cavity at each end of the nozzle. The glass streams were 14 inches wide at the overflow edges; the final width of the ribbon was 11 inches. The thickness of the ribbon was substantially uniform from edge to edge.

I claim:
1. Apparatus for producing glass sheets comprising,
a nozzle having a cavity defined by outside walls which terminate and join at an apex, and vertically disposed end walls, said outside walls having horizontally disposed upper edges forming with said end walls a perimeter for said cavity,
means to deliver molten glass into said cavity so as to fill said cavity, whereby said molten glass overflows said edges, forms streams along said walls and join as a sheet at said apex,
said sheet being less in width than the streams at said edges, and
means to restrict the quantity of glass flowing adjacent the ends of said nozzle, whereby the quantity of glass is reduced in the edges of said sheet and a ribbon is produced having substantially uniform thickness from side to side, said restricting means being pyramidal-shaped members adjustably positioned within said cavity adjacent each of said end walls of the nozzle, said pyramidal-shaped members each having an upper surface bound by angularly disposed interconnected edges positioned immediately above the surface of the glass within said cavity of said nozzle, one of said edges of said pyramidal-shaped members being positioned closely adjacent but spaced from one of said end walls of said nozzle.

2. Apparatus as recited in claim 1 in which said pyramidal-shaped members have apices which face each other.

3. Apparatus for producing glass sheets comprising, a nozzle having a cavity defined by outside walls which terminate and join at an apex, and vertically disposed end walls, said outside walls having horizontally disposed upper edges forming with said end walls a perimeter for said cavity, means to deliver molten glass into said cavity so as to fill said cavity, whereby said molten glass overflows said edges, forms streams along said walls and joins as a sheet at said apex, said sheet being less in width than the streams at said edges, and means to restrict the quantity of glass flowing adjacent the ends of said nozzle, whereby the quantity of glass is reduced in the edges of said sheet and a ribbon is produced having substantially uniform thickness from side to side, said restricting means being generally wedge-shaped members adjustably positioned within said cavity adjacent each of said end walls of the nozzle, said wedge-shaped members each having an upper surface bound by angularly disposed interconnected edges positioned immediately above the surface of the glass within said cavity of said nozzle, one of said edges of said wedge-shaped members being positioned closely adjacent but spaced from one of said end walls of said nozzle.

References Cited

UNITED STATES PATENTS

| | | | |
|---|---|---|---|
| 1,673,907 | 6/1928 | Ferngren | 65—53 |
| 3,345,150 | 10/1967 | Ihrig | 65—333 |
| 3,451,798 | 5/1969 | Simon | 65—90 |

S. LEON BASHORE, Primary Examiner

J. B. HARDAWAY, Assistant Examiner

U.S. Cl. X.R.

65—53, 121, 129, 199